US007108605B2

(12) United States Patent
LeMay et al.

(10) Patent No.: US 7,108,605 B2
(45) Date of Patent: Sep. 19, 2006

(54) EPROM FILE SYSTEM IN A GAMING APPARATUS

(75) Inventors: Steven G. LeMay, Reno, NV (US); Andrew M. Rodgers, Reno, NV (US); Robert E. Breckner, Sparks, NV (US); Xuedong Chen, Reno, NV (US)

(73) Assignee: IGT, Reno, NV (US)

( * ) Notice: Subject to any disclaimer, the term of this patent is extended or adjusted under 35 U.S.C. 154(b) by 645 days.

(21) Appl. No.: 10/261,067

(22) Filed: Sep. 30, 2002

(65) Prior Publication Data

US 2004/0063495 A1 Apr. 1, 2004

(51) Int. Cl.

*G06F 12/14* (2006.01)
*G06F 12/02* (2006.01)
*G06F 11/36* (2006.01)
*A63F 1/00* (2006.01)
*A63F 3/06* (2006.01)
*A63F 5/04* (2006.01)

(52) U.S. Cl. ............................ 463/43; 463/22; 463/29; 711/102; 711/103; 711/202; 711/216; 713/187; 713/189

(58) Field of Classification Search .................... 463/9, 463/10, 11, 12, 13, 16, 17, 18, 19, 20, 21, 463/22, 25, 29, 30, 31, 43

See application file for complete search history.

(56) References Cited

U.S. PATENT DOCUMENTS 5,535,357 A 7/1996 Moran et al. ............... 395/430
5,643,086 A * 7/1997 Alcorn et al. ................. 463/29
5,707,286 A * 1/1998 Carlson ....................... 463/16
5,933,846 A * 8/1999 Endo .......................... 711/103
6,106,396 A * 8/2000 Alcorn et al. ................. 463/29
6,149,522 A * 11/2000 Alcorn et al. ................. 463/29
6,168,077 B1 * 1/2001 Gray et al. ................. 235/375
6,256,642 B1 7/2001 Krueger et al. ............. 707/205
6,270,412 B1 * 8/2001 Crawford et al. ............. 463/20
6,319,125 B1 * 11/2001 Acres .......................... 463/25
6,364,769 B1 * 4/2002 Weiss et al. .................. 463/29
6,397,317 B1 * 5/2002 Kusutaki .................... 711/202

(Continued)

OTHER PUBLICATIONS

"The Silicon Gaming Odyssey Slot Machine," pp. 296 to 301, IEEE Xplore database, 1063-6390/97, © 1997 IEEE.*

(Continued)

*Primary Examiner*—Xuan M. Thai
*Assistant Examiner*—Matthew D. Hoel
(74) *Attorney, Agent, or Firm*—Marshall, Gerstein & Borun LLP

(57) ABSTRACT

A gaming apparatus is provided comprising a display unit that is capable of generating video images, a value input device, and a controller operatively coupled to said display unit and said value input device The controller comprises a processor, a random access memory and a read only memory operatively coupled to the processor. The controller is programmed to detect, in a computer software instruction, a name of a computer program to be executed, and to access memory to retrieve a memory address corresponding to the name of the computer program to be executed. The controller is also programmed to cause the computer program to be retrieved from the memory utilizing the memory address, and to execute the computer program retrieved from the memory.

The controller is further programmed to allow a person to make a wager, to cause a video image representing a game to be generated on the display unit, and to determine, after the video image has been displayed, a value payout associated with an outcome of the game represented by the video image.

16 Claims, 18 Drawing Sheets

U.S. PATENT DOCUMENTS

| | | | | |
|---|---|---|---|---|
| 6,457,126 | B1 * | 9/2002 | Nakamura et al. | 713/166 |
| 6,488,581 | B1 | 12/2002 | Stockdale | 463/29 |
| 2002/0052230 | A1 * | 5/2002 | Martinek et al. | 463/10 |
| 2002/0132660 | A1 | 9/2002 | Taylor | 463/16 |

OTHER PUBLICATIONS

International Search Report for Application No. PCT/US03/28765 dated Feb. 17, 2004.

* cited by examiner

FIG. 7A

| NAME | ADDRESS |
|---|---|
| Signature | 0x00000 |
| Driver | 0x02000 |
| Authenticate | 0x03500 |
| RNG | 0x04500 |

FIG. 7B

| NAME | ADDRESS |
|---|---|
| Signature | 0x00000000 |
| Driver | 0xBA100000 |
| Authenticate | 0xBA110000 |
| RNG | 0xBA200000 |

EPROM FILE SYSTEM IN A GAMING APPARATUS

BACKGROUND

Traditional gaming apparatuses utilize read only memories ("ROMs") to store a variety of executable software routines as well as non-executable text files. The data stored on these ROMs is typically not compressed and is stored as a single binary image file. To access an executable software routine or a non-executable text file stored on the ROM, a controller must know exactly where the data is stored in the ROM. In other words, the exact memory address for the beginning point of the file must be known. If the exact memory address is known, the controller will jump to the location within the ROM or a mapped virtual memory. Furthermore, adding more data or files into an image on traditional ROMs has an affect on other software written to execute the software or retrieve the data because the image on the ROM will need to be rebuilt, causing the subsequent memory addresses to change.

SUMMARY OF THE INVENTION

According to an aspect of the present invention, a gaming apparatus is disclosed including a display unit that is capable of generating video images, a value input device, and a controller operatively coupled to the display unit and the value input device, the controller comprising a processor, a random access memory and a read only memory that is operatively coupled to the processor. The controller is programmed to detect, in a computer software instruction, a name of a portion of a computer program to be executed, and to determine a memory address corresponding to the name of the portion of the computer program to be executed The controller is also programmed to cause the portion of the computer program to be retrieved from the memory utilizing the memory address and to execute the portion of the computer program retrieved from the memory.

Additionally, the controller is programmed to allow a person to make a wager and to cause a video image representing a game to be generated on said display unit. The video image represents one of the following games: video poker, video blackjack, video slots, video keno or video bingo. The video image includes an image of at least five playing cards if the game comprises video poker, an image of a number of simulated slot machine reels if the game comprises video slots, an image of a number of playing cards if the game comprises video blackjack, an image of a number of keno numbers if the game comprises video keno, and an image of a bingo grid if the game comprises video bingo. The controller is also programmed to determine a value payout associated with an outcome of the game.

The controller may determine the memory address by accessing the memory to retrieve the memory address, wherein the memory is the read only memory. The read only memory may comprise an EPROM having operating system software stored therein. The controller may also be programmed to check the validity of a set of data stored on the read only memory using a data hashing algorithm.

According to another aspect of the invention, a method is disclosed for detecting, in a computer software instruction, a name of a portion of a computer program to be executed and determining a memory address corresponding to the name of the portion of the computer program to be executed. The method also includes causing the portion of the computer program to be retrieved from an EPROM utilizing the memory address and then executing the portion of the computer program. Additional aspects of the invention are defined by the claims of this patent.

BRIEF DESCRIPTION OF THE DRAWINGS

FIGS. 7A and 7B illustrate look-up tables for a plurality of executable and text files and corresponding hexadecimal memory locations of the images in an extended BIOS EPROM and a RAM, respectively.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
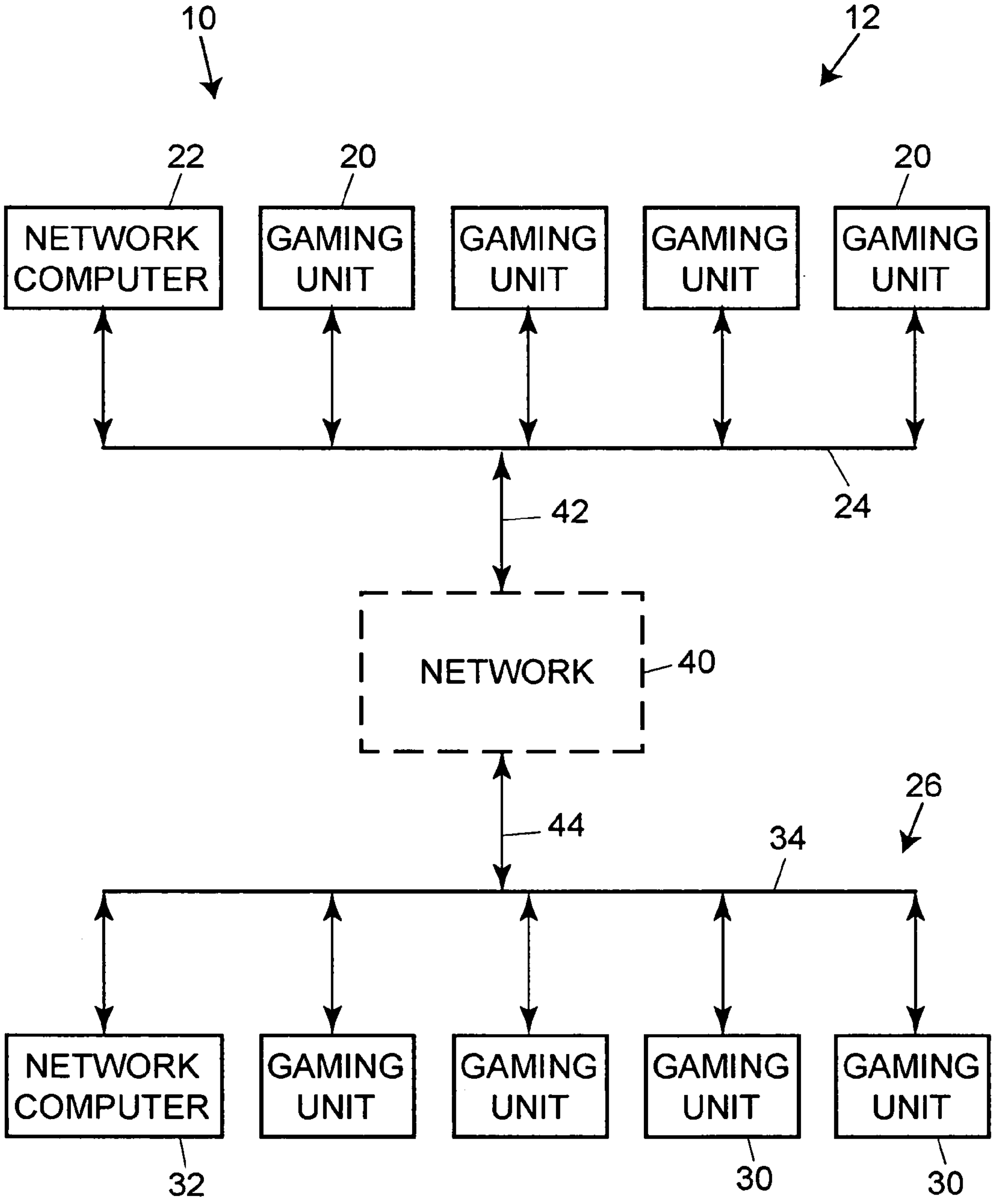
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
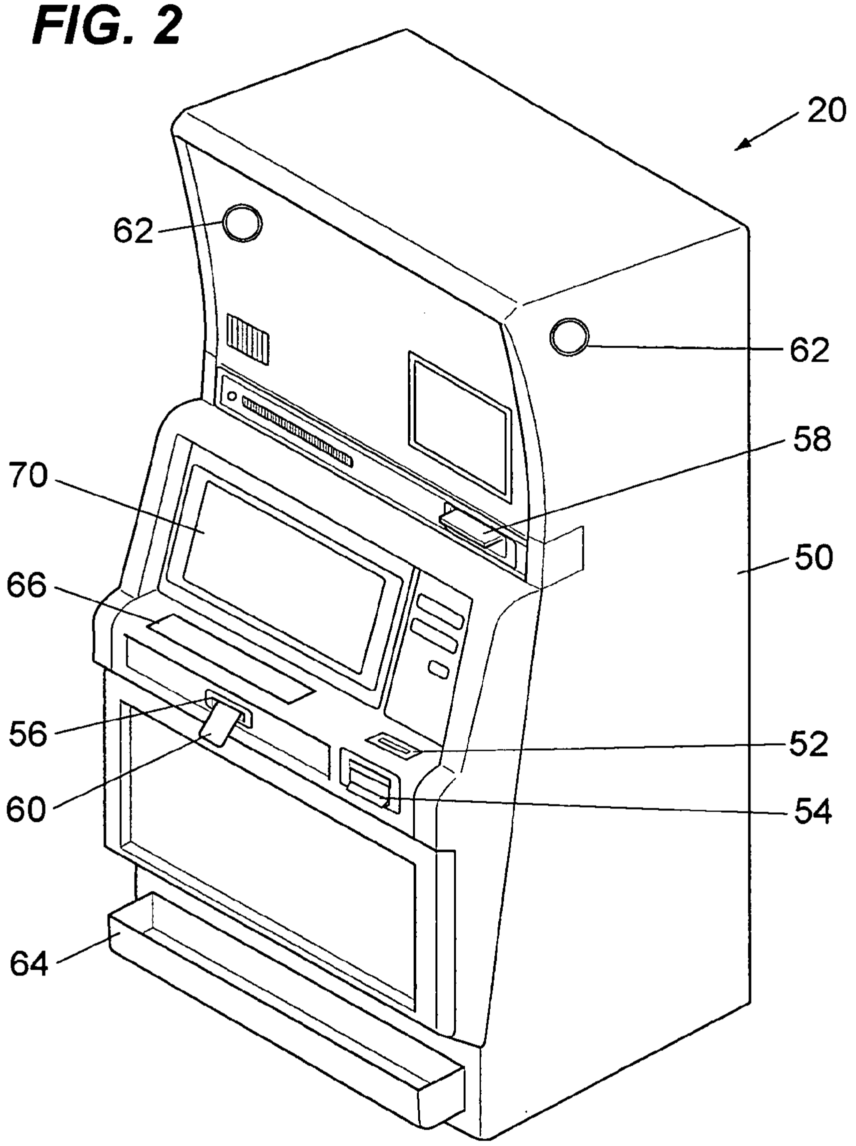
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
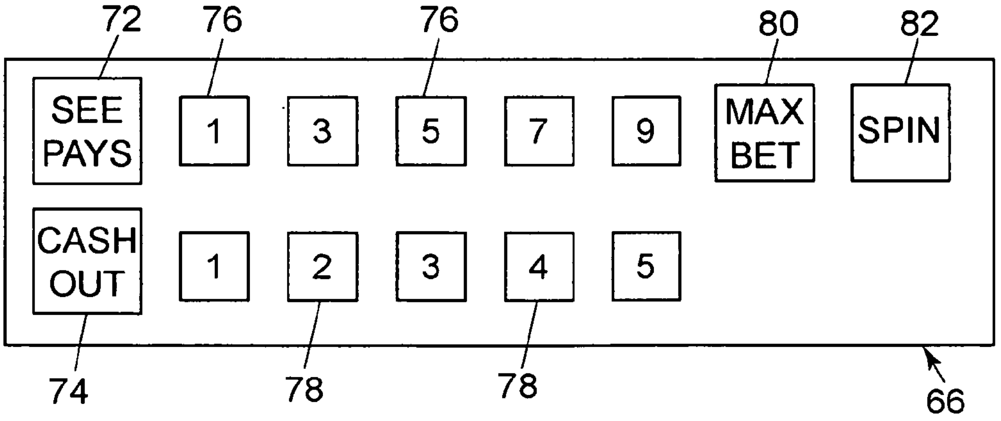
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
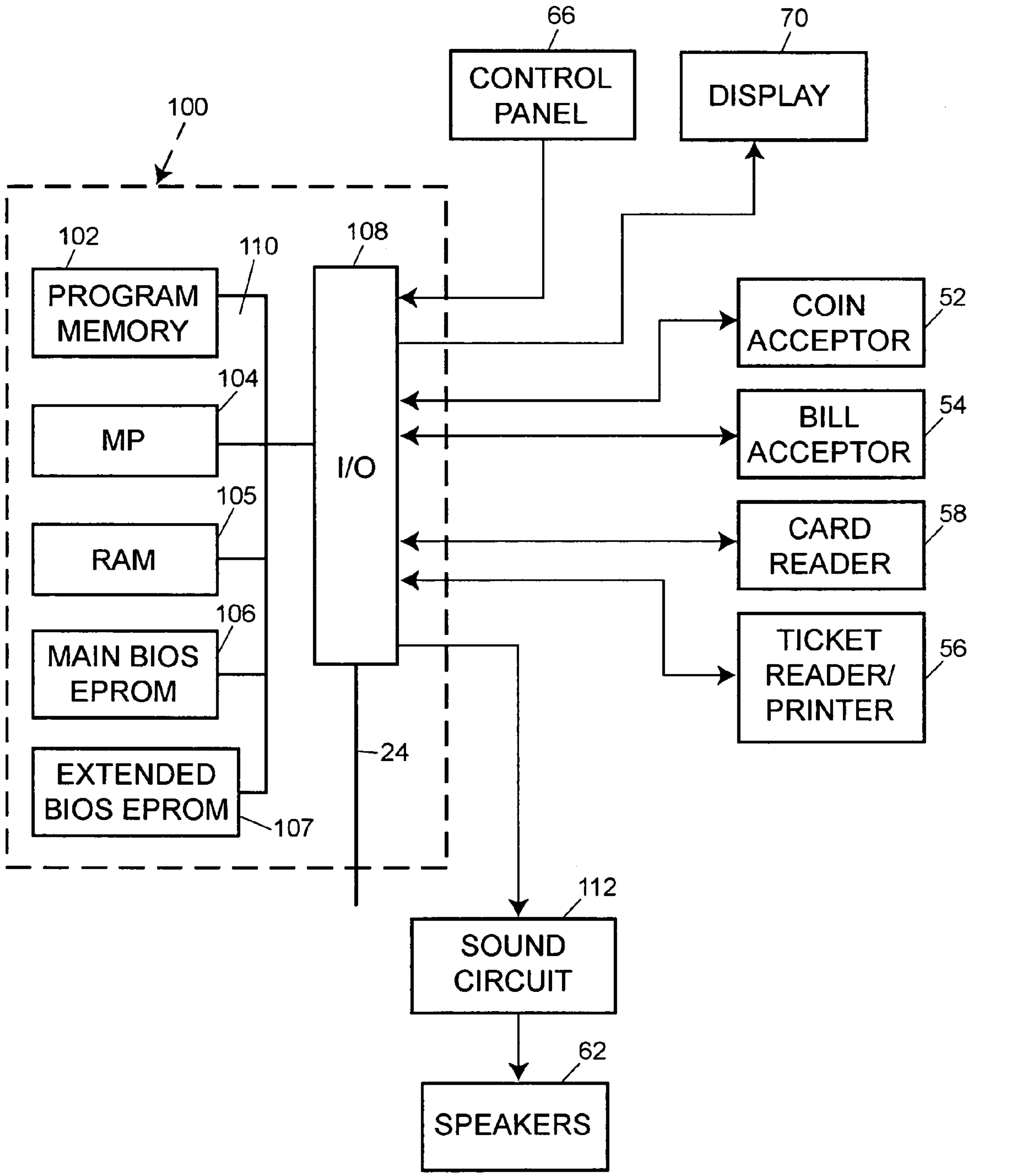
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 105, a main BIOS EPROM 106, an Extended BIOS EPROM 107 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 105, multiple program memories 102 and multiple EPROMS 106, 107. While not shown, additional EPROMs may be included. Also, other types of memory may be used in place of the EPROMs, such as, for example, flash memory built into the motherboard chipset, or onboard OTP FPGA, or some other physically secure device. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Figure 4:
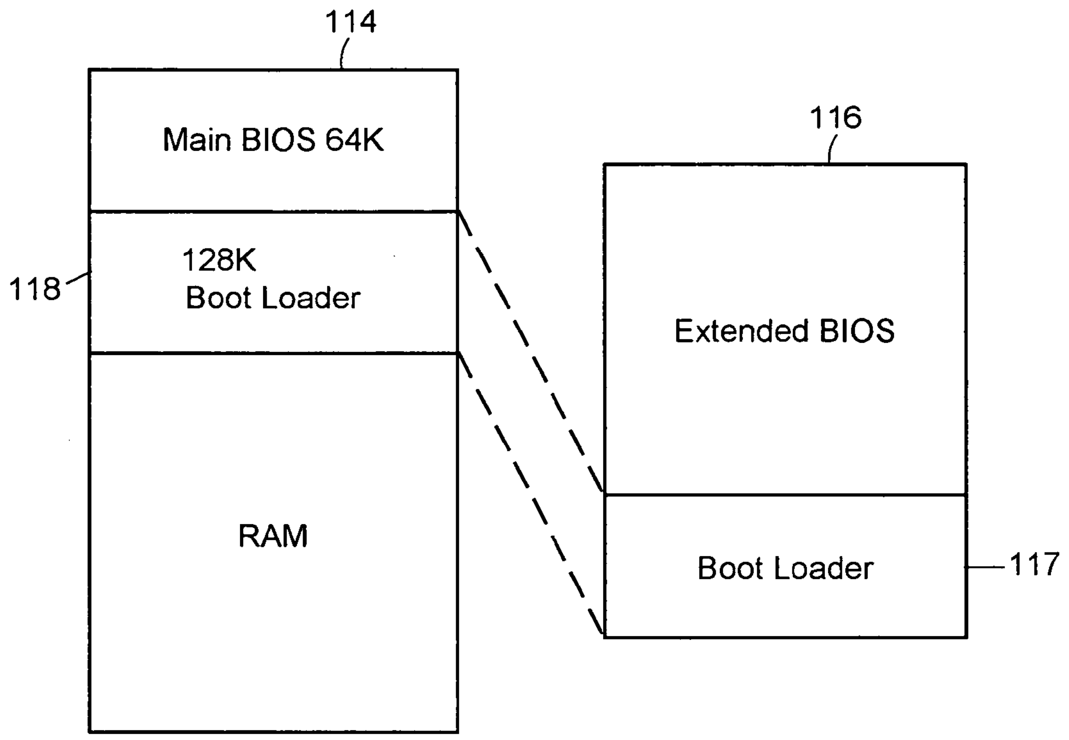
FIG. 4 illustrates an embodiment of a system mapping between an extended BIOS and RAM.

FIG. 4 illustrates one possible embodiment of a system mapping between an extended BIOS 116 located on the extended BIOS EPROM 107 and the RAM 105 in accordance with the invention. Referring to FIG. 4, the main BIOS EPROM 106 may be a 256 K-size EPROM which accommodates the system main BIOS 114. The main BIOS EPROM 106 may be configured to occupy the physical address space 0xFFFC0000~0xFFFFFFFF. Once powered on or warm started, the microprocessor 104 jumps to the address of 0xFFFFFFF0 where a long jump instruction is placed. This is the entry point of the entire system boot-up. From this point, main BIOS obtains system control and carries out a plurality of predetermined operations. These operations are discussed in reference to FIG. 9.

Still referring to FIG. 4, the main BIOS EPROM 106 may be programmed to look for the extended BIOS EPROM 107 during a system boot-up. To ensure that a found EPROM is an extended EPROM, the main BIOS 114 regulates a signature, wherein the signature may be, for example, a string, a hex pattern, a digital fingerprint, etc. The signature could also be cryptic with a private key. When the main BIOS 114 finds the EPROM, the main BIOS 114 may read and compare the signature. If the signature is the correct signature, the main BIOS 114 may shadow the first 128 K of the extended BIOS EPROM to a specific memory location. Alternatively, if the signature is the correct signature, the main BIOS EPROM 106 may be further programmed to check the integrity of either a portion of the extended BIOS EPROM 107 or the entire extended BIOS EPROM 107, by calculating a checksum or CRC, or any other data hashing algorithm such as MD4, MD5, SHA1, SHA256, etc. Thereafter, if the additional integrity check determines that the data on the extend BIOS EPROM 107 has not been altered, the main BIOS 114 may shadow the first 128 K of the extended BIOS EPROM to a specific memory location. Persons of ordinary skill in the art will readily appreciate that, in most circumstances, the size of the Boot Loader 117 will not exceed the size of the Boot Loader 118. In this example, that size is 128K.

Figure 5:
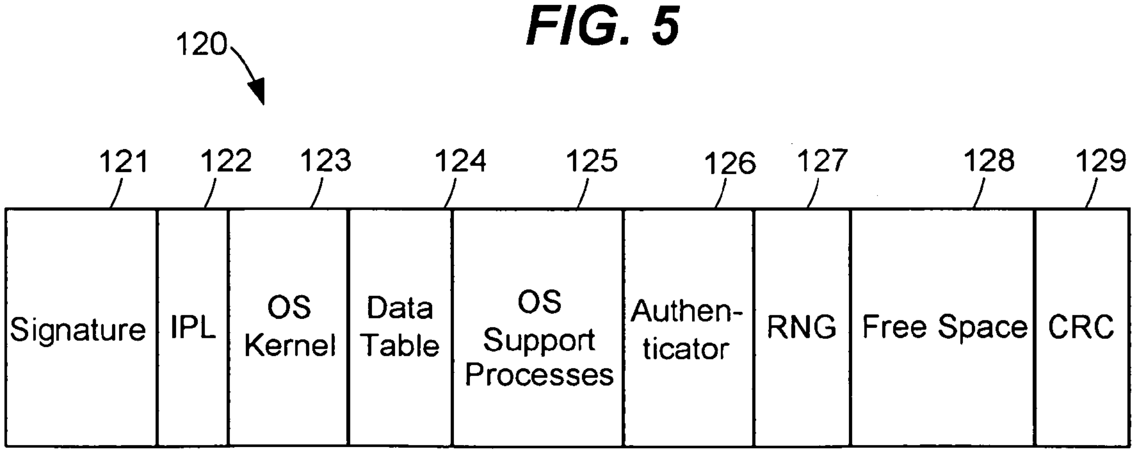
FIG. 5 illustrates an exemplary memory layout of an extended BIOS EPROM.

FIG. 5 illustrates an exemplary memory layout 120 of the extended BIOS EPROM 107 in accordance with the invention. Referring to FIG. 5, the extended BIOS EPROM 107 may be a 1M-size EPROM storing the entire image of the memory layout 120 in a compressed format. The memory layout 120 may include a Signature portion 121 which is used to authenticate the extended BIOS EPROM 107 when the main BIOS EPROM 106 checks to ensure that the extended BIOS EPROM 107 is from a trusted source. The Signature portion 121 may be a predetermined alpha-numeric string that is associated with a particular vendor or gaming apparatus manufacturer. The signature portion 121 may add to the integrity of the system and increase the overall security of the system. The signature portion 121 may also represent the result of a data hashing algorithm such as, for example, checksum, CRC 16, CRC 32, MD4, MD5, SHA1, SHA256. The resulting value of the data hashing algorithm may further be encrypted as an additional security measure, wherein the encryption may be performed with a public key. Those of ordinary skill in the art will appreciate that the signature portion 121, like the other portions 122–129 may be located in other locations on the extended BIOS EPROM 107.

The memory layout 120 may also include an Initial Program Loader (IPL) portion 122. The IPL may be used to copy the startup code from the BIOS EPROMs 106 and 107 to the RAM 105 and transfer system control to the startup code. The memory layout 120 may also include a Real Time Operating System (RTOS) kernel 123 and a directory data table 124. The RTOS kernel 123 is the core of the operating system that provides basic services for all other parts of the operating system. An exemplary RTOS kernel may be the Neutrino Micro-kernel QNX6 which is available from QNX Software Systems Ltd. in Ottawa Canada. Because the RTOS kernel 123 is needed frequently, it may be shadowed into the RAM 105 in an area that is protected so that the RTOS kernel is not overlaid with other less frequently used parts of the operating system.

The memory layout 120 may also include one or more OS support processes 125, which could comprise, for example, disk drivers to support a plurality of input/output devices that are connected to the controller 100, TCPIP, etc. If disk drivers are present, they may include, for example, a pci-bios driver and an EIDE driver. A media storage authenticator may also be included at a position 125, as well as a Random Number Generator (RNG) process which is located at a position 127 of the memory layout 120. Additional free space 128 may also be present on the memory layout 120, as well as a cyclical redundancy check ("CRC") algorithm 129. The CRC 129 may be utilized to calculate a redundancy check across the main BIOS EPROM 106 and the extended BIOS EPROM 107 resulting in a single value for both. The CRC 129 may be a CRC 16, a CRC 32, or any other data hashing algorithm such as, for example, checksum, MD5, SHA1, etc.

The extended BIOS EPROM 107 may therefore store a file/utility that is started from the extended BIOS to verify the EPROMs 107 integrity. Thus, the extended BIOS could be made to be of a unique value and stored in any location on the extended BIOS EPROM 107. Alternatively, the main BIOS EPROM 106 could store a hash value of the entire extended BIOS EPROM 107 or a portion of the extended BIOS EPROM 107. A special format, such as a standard BIOS extension format could also be used. The main BIOS EPROM 106 could thus verify the extended BIOS EPROM 107 by checking its format and the hash value of the whole or portion of the image. Those of ordinary skill in the art will understand that the extended BIOS EPROM 107 may be used to check the integrity of the main BIOS EPROM 106, or any other EPROM, using a similar technique.

It should be noted that after the RTOS kernel is initialized, the device drivers, the media storage authenticator, the RNG process, and any other executable files stored on the extended BIOS EPROM 107 may be activated using their file system name. Those persons of ordinary skill in the art will understand that the files may be called and executed using the file system names from either the image located on the extended BIOS EPROM 107 or the decompressed image located on the RAM 105. RTOS kernel initialization, additional "file system" functionality is also available on the extended BIOS EPROM 107 similar to that found on traditional hard drives, CD-ROMs, and other mass storage media. In other words, the files stored on the EPROM 107 may be manipulated with standard OS functions and/or utilities (eg. Is, cat, cp, etc.) The file manipulation could include using only a filename to change access permissions, copy files, read files, obtain a file attribute, execute a file, etc.

Figure 6:
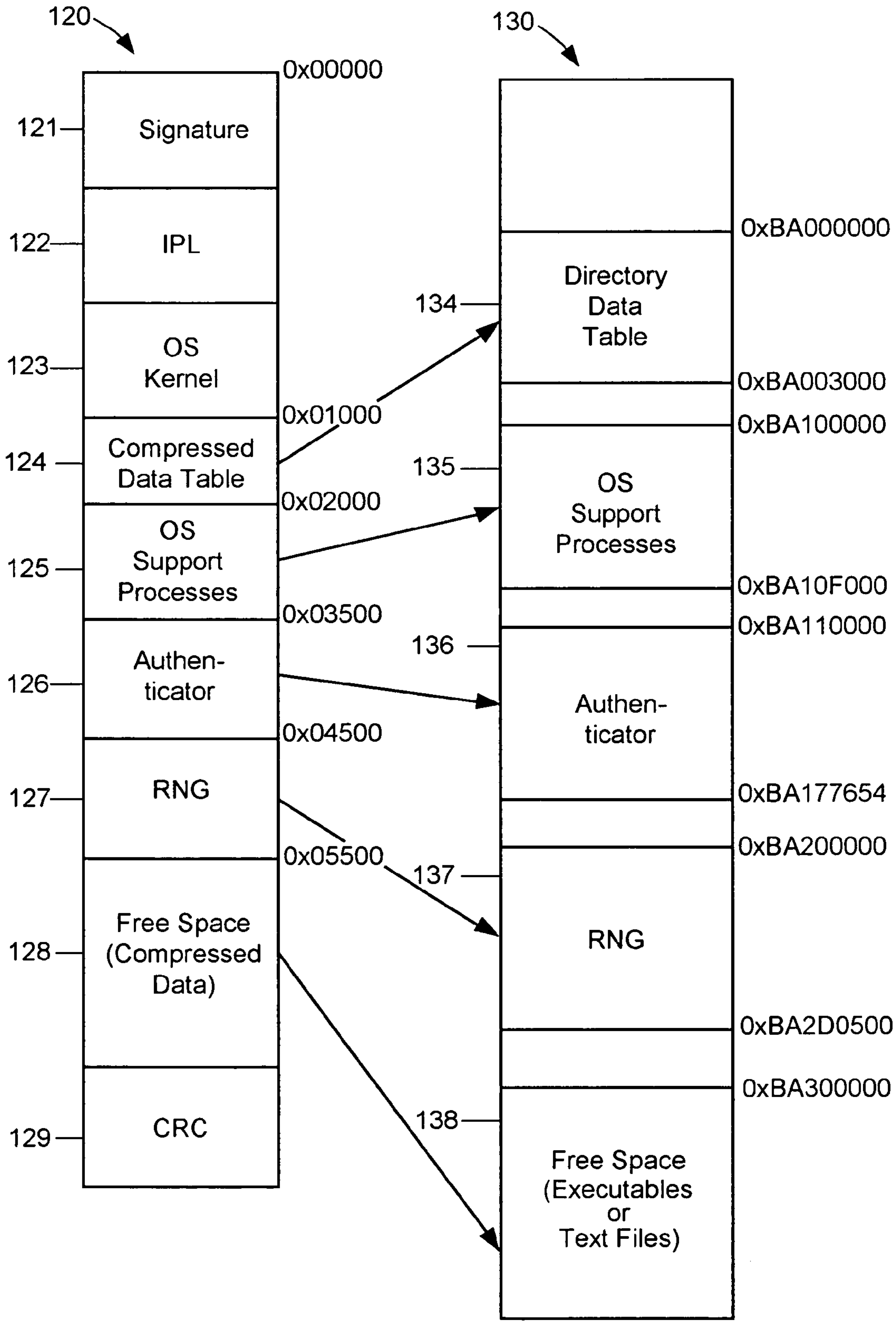
FIG. 6 illustrates an exemplary memory layout of compressed data in an extended BIOS EPROM and a corresponding memory layout of the decompressed data in a RAM.

FIG. 6 illustrates an exemplary memory layout of how a plurality of executable files, text files, HTML files, etc. may be extracted from the extended BIOS EPROM 107 and mapped into the RAM 105. As shown in FIG. 6, the extended BIOS EPROM view is shown at 120 and the RAM view is shown at 130. As previously discussed, the extended BIOS EPROM 107 may include a signature section 121 which begins at the hexadecimal memory location 0x00000. As previously discussed, the signature portion 121 may be a data string or it may be a more sophisticated data hashing algorithm. The extended BIOS EPROM view 120 may also include an IPL section 122 and an OS kernel section 123, after the signature section 121. A compressed data table (section 124) may also be included, wherein the data table's memory location begins at the hexadecimal memory location 0x01000. The compressed data table 124 may be extracted and mapped to the RAM 105, beginning at the RAM memory location 0xBA00000 and shown at a section 134. The data mapped into the section 134 may comprise a directory data table for a plurality of other programs and files mapped into the RAM 105. Additional descriptions of the data table are located with reference to FIGS. 7A and 7B. It should be noted that the data in the extended BIOS EPROM view 120 may be compressed to conserve memory space, but the data does not have to be compressed.

The compressed OS support processes (section 125) may be located, beginning at the hexadecimal memory location 0x2000. The OS support processes stored in the section 125 of the extended BIOS EPROM 107 may be mapped into the RAM 105, beginning at the RAM memory location 0xBA100000 and shown at a section 135. The software for the authenticator routine (section 126) may be located beginning at the hexadecimal memory location 0x500. The software stored in the section 126 of the extended BIOS EPROM 107 may be mapped into the RAM 105, beginning at the RAM memory location 0xBA110000 and shown at a section 136. The software for the RNG routine (section 127) may be located beginning at the hexadecimal memory location 0x4500. The software stored in the section 127 of the extended BIOS EPROM 107 may be mapped into the RAM 105, beginning at the RAM memory location 0xBA200000 and shown at a section 137. Additional software comprising executable software and/or text files may also be stored in the extended BIOS EPROM 107 in a section 128 described as free space. This data may be located beginning at the hexadecimal memory location 0x5500. The data stored in the section 128 of the extended BIOS EPROM 107 may be mapped into the RAM 105, beginning at the RAM memory location 0xBA300000 and shown at a section 138. Those of ordinary skill in the art will appreciate that the software and other files (text, HTML, etc.) may be located at any available memory locations on the extended BIOS EPROM 107 and the RAM 105.

FIG. 7A illustrates a look-up table for a plurality of executable and other files and their corresponding hexadecimal memory locations in the extended BIOS EPROM 107. The left column in the table represents the alphanumeric filename for the executable software routines or other files that are stored on the extended BIOS EPROM 107. The right column in the table represents the hexadecimal memory locations for the corresponding executable software routines or other files. The table may be utilized by an operating system or an operating system kernel to locate a file stored in the extended BIOS EPROM 107 that has been requested with only the filename. This will allow executable software routines to be executed and other files to be extracted from the extended BIOS EPROM 107 in a manner similar to that used in other storage devices, such as, for example, a hard drive. For example, if the controller 100 detects a software instruction calling the random number generator using a call such as "/rng" the microprocessor 104 may be programmed to locate the filename "rng" in the data table, retrieve the memory address 0x03500, and launch the executable file "rng" stored on the extended BIOS EPROM 107.

FIG. 7B illustrates a look-up table for a plurality of executable and other files and their corresponding hexadecimal memory locations in the RAM 105. The left column in the table represents the alphanumeric filename for the executable software routine or other files that are extracted from the extended BIOS EPROM 107 and loaded into the RAM 105. The right column in the table represents the hexadecimal memory locations for the corresponding executable software routines or other files. As with the table in FIG. 7A, the table in FIG. 7B may be utilized by an operating system or an operating system kernel to locate a file stored in the RAM 105 that has been requested with only the filename. This will allow executable software routines to be executed and other files to be extracted from the RAM 105 in a manner similar to that used in other storage devices, such as, hard drives. For example, if the microprocessor 104 detects a software instruction calling the random number generator using a call such as "/rng" the microprocessor 104 may be programmed to locate the filename "rng" in the data table, retrieve the memory address 0xBA20000, and launch the executable file "rng" loaded on the RAM 105. It should also should be noted that the data extracted into the RAM 105 may be stored in such a way that the data is not subsequently overwritten by the microprocessor 104.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 105, 106, and 107 are physically and/or structurally configured in accordance with computer program instructions.

Figure 8:
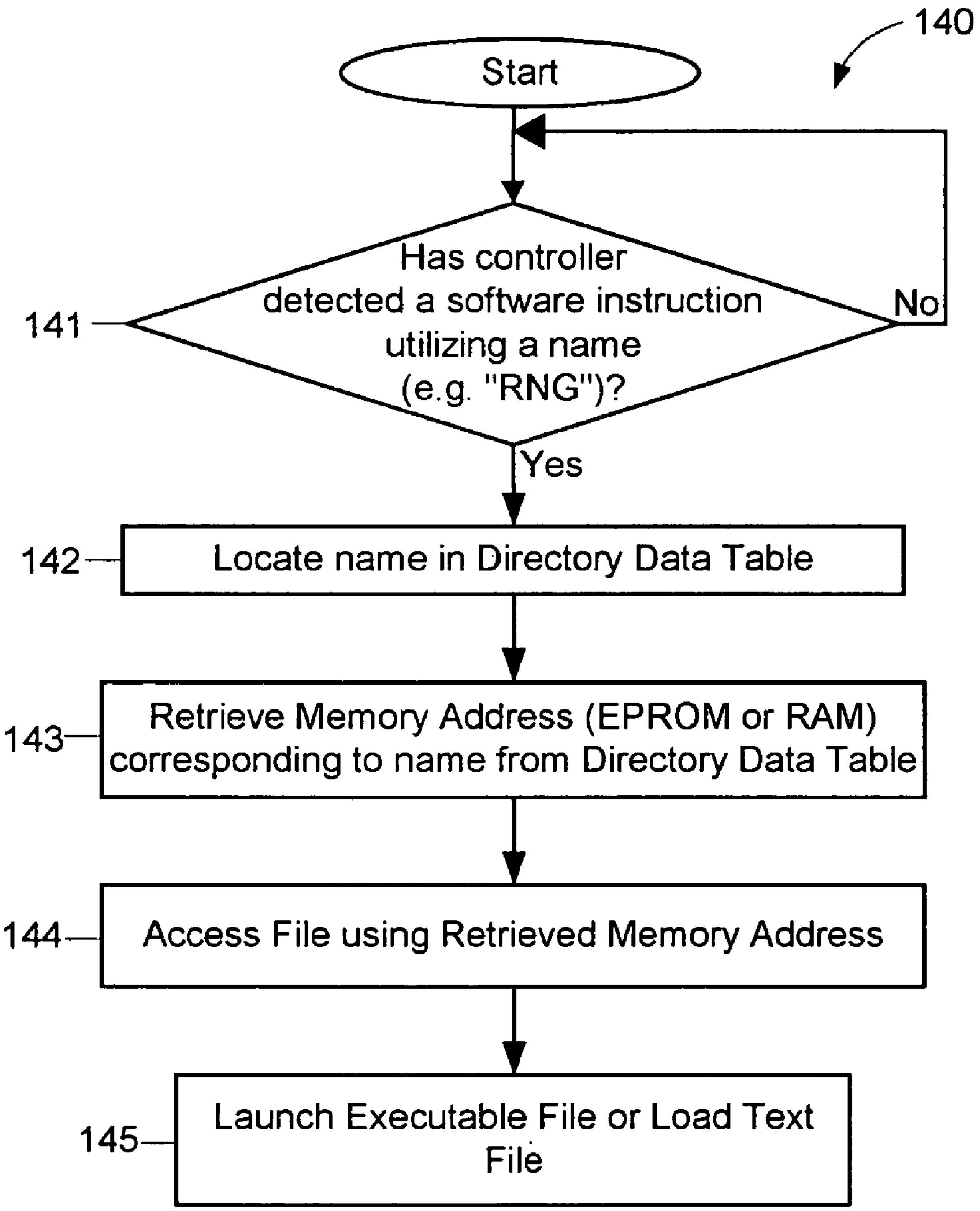
FIG. 8 is an exemplary flowchart of a routine that may be performed to detect, find and retrieve a file using an alphanumeric filename.

FIG. 8 is an exemplary flowchart of a routine 140 that may be performed to detect, find and retrieve a file using an alphanumeric filename. The routine 140 may be called by an OS kernel in a pre-boot environment or by a fully loaded OS in an OS runtime environment. The routine 140 may be initiated when the controller 100 detects a software instruction utilizing a filename, such as "rng." The requested file may be executable software or other files (text, HTML, etc.). If such a request is detected (block 141), the controller 100 may be programmed to check if the file exists, and if found, locate the filename in a data table (block 142). The controller 100 may then retrieve the memory address (block 143) in the RAM 105 corresponding to the filename in the data table and access the file using the retrieved memory address (block 144). The controller 100 may alternatively retrieve the memory address in the extended BIOS EPROM 107 corresponding to the filename in a data table, allocate memory for loading the file, and load the file from the extended BIOS EPROM 107 to the RAM 105. The controller may then launch the software if it is an executable file, load the text if the file is a text file, load the web page if the file is an HTML file, etc., (block 145).

Figure 9:
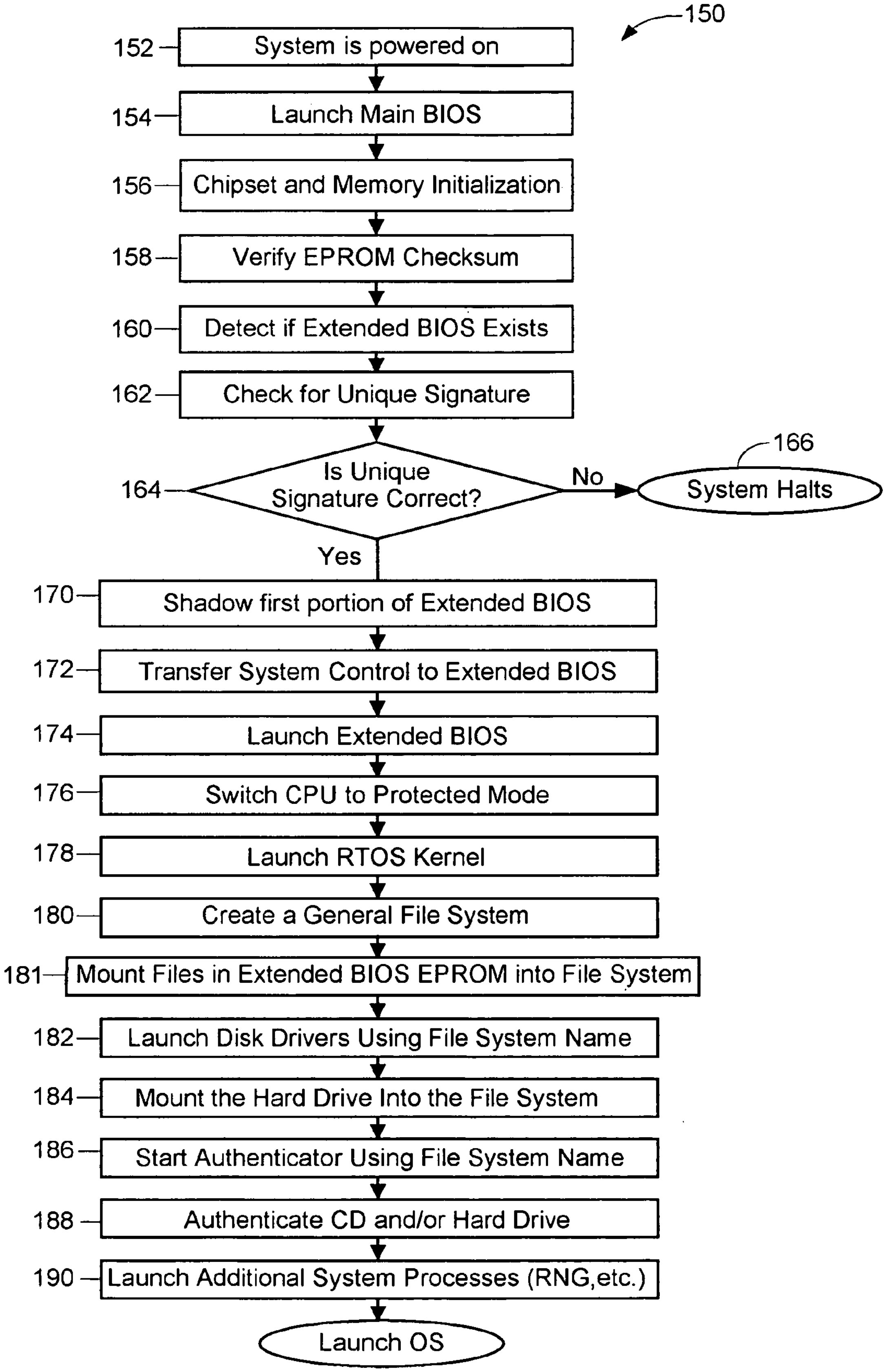
FIG. 9 is an exemplary flowchart of a process to load and/or execute file(s) from an EPROM.

FIG. 9 is an exemplary flowchart of a process 150 that may be performed to load, execute, copy, or manipulate a file from an EPROM using an alphanumeric filename, wherein the file is displayed in a file system on the EPROM. The process 150 begins when the system is powered on or warm started (block 152) and the main BIOS from the main BIOS EPROM 106 is launched (block 154). From this point, the main BIOS gets system control and carries out a plurality of predetermined operations. The predetermined operations include performing chipset and memory initialization (block 156) and verifying the EPROM checksum (block 158). The main BIOS may be customized to look for an extended BIOS EPROM (block 160), and if one is found, it may check to ensure that the extended BIOS EPROM is from a trusted source. This may be done by reading and comparing a signature on the extended BIOS EPROM (block 162). An exemplary extended BIOS EPROM may be the extended BIOS EPROM 107 shown in FIG. 3. As previously discussed, the main BIOS may alternatively be programmed to check for a signature that comprises an encrypted value resulting from a data hashing algorithm.

If it is determined that the signature on the extended BIOS EPROM 107 is correct (block 164), the routine 150 may shadow the first portion of the extended BIOS on the extended BIOS EPROM 107 (block 170) as previously discussed with reference to FIG. 4. This includes copying the boot image and loading it into the RAM 105. If an extended BIOS EPROM is not found or if an invalid extended BIOS EPROM is found, the routine 150 may be programmed to cause the system to halt both the system and bootup (block 166).

After shadowing a portion of the extended BIOS, system control may be transferred to the extended BIOS (block 172) when the extended BIOS is launched (block 174). The controller 100 may then be switched to protected mode (block 176) and an operating system (OS) kernel may be launched (block 178). The OS kernel may be structured as a tiny kernel that provides the minimal services used by a team of optional cooperating processes, which in turn provide the higher level OS functionality. The OS kernel may also include a number of common device drivers, shared libraries, and some executable software routines. A general file system may then be created (block 180) and the files in the extended BIOS EPROM may be mounted into the file system (block 181).

Once the OS kernel has launched, the routine 150 may launch a plurality of executable software routines utilizing software instructions with only a filename, similar to launching executable software routines from a hard drive. These executable software routines may be launched without knowledge of the physical or virtual memory address of the software on either the extended BIOS EPROM 107 or the RAM 105, or without writing any special mapping code. In addition to executable software routines, data files, HTML files, or any other type of files may also be retrieved in a similar fashion. This unique ability may be accomplished using the routine described with reference to FIG. 8.

Examples of executable software that may be launched using only a filename include disk drivers (block 182) or any other OS supported processes. The controller may then be programmed to mount the hard drive into the file system (block 184). Thereafter, media authentication software may be launched (block 186). The media authentication software may check the firmware's integrity and authenticate one or more mass media storage devices inside the system by public key cryptosystem (block 188). Additional system processes may also be launched (block 190). For example, an executable software process to generate a random number may also be stored on the extended BIOS EPROM 107, copied to the RAM 105, and launched using only its filename, such as, for example "/rng". These executable software routines or processes may be launched during the boot process and after the operating system has fully loaded. Because some of the files may be started during the boot-up, they may take control of the gaming apparatus in areas such as authenticating the mass storage, establishing a network connection, downloading a game image, etc.

Figure 10:
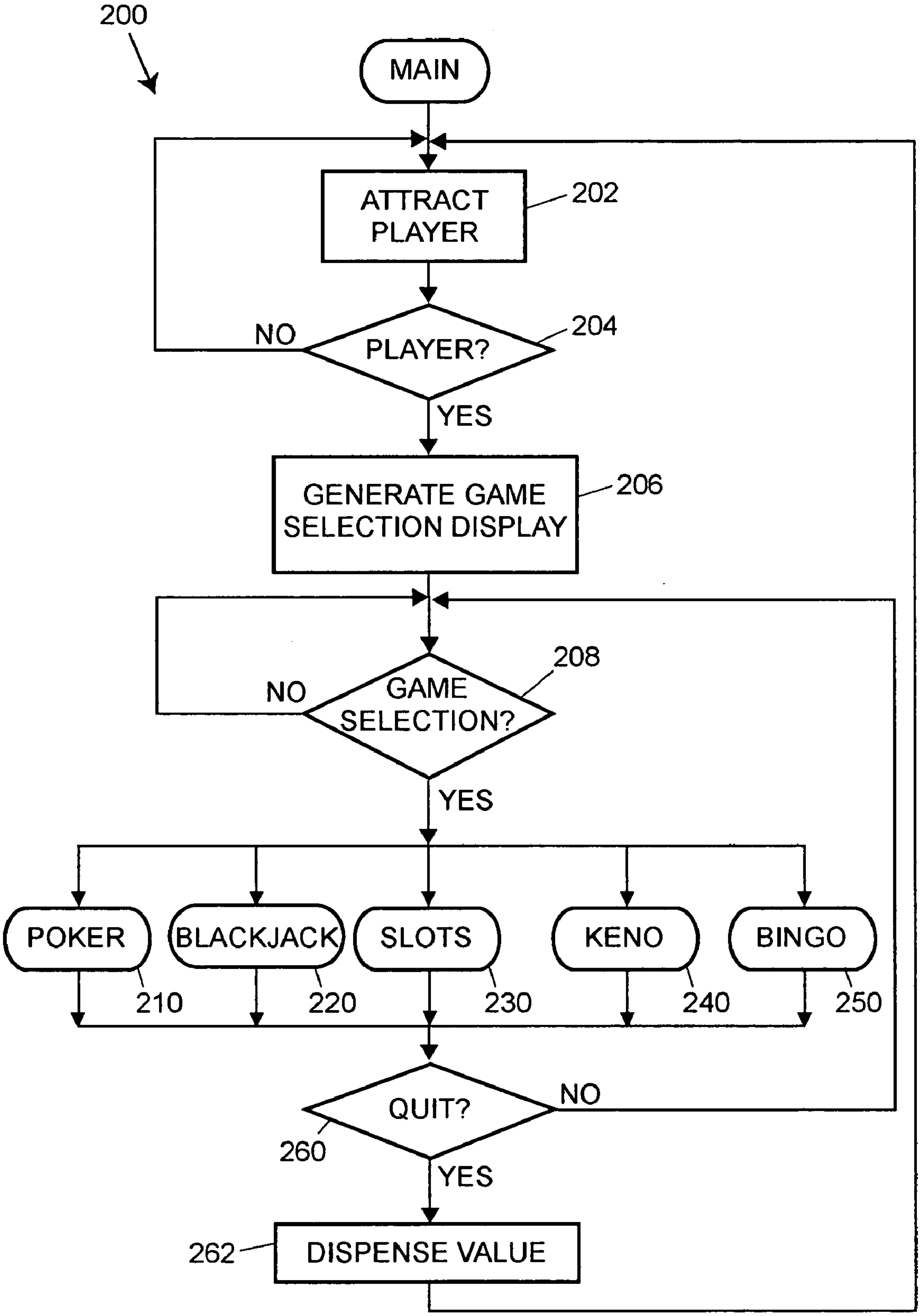
FIG. 10 is a flowchart of an embodiment of a main routine that may be performed during operation of one or more of the gaming units.

FIG. 10 is a flowchart of a main operating routine 200 that may be stored in the memory of the controller 100. Referring to FIG. 10, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 10, a different number of routines could be included to allow play of a different number of games. The gaming unit 20 may also be programmed to allow play of different games.

Figure 11:
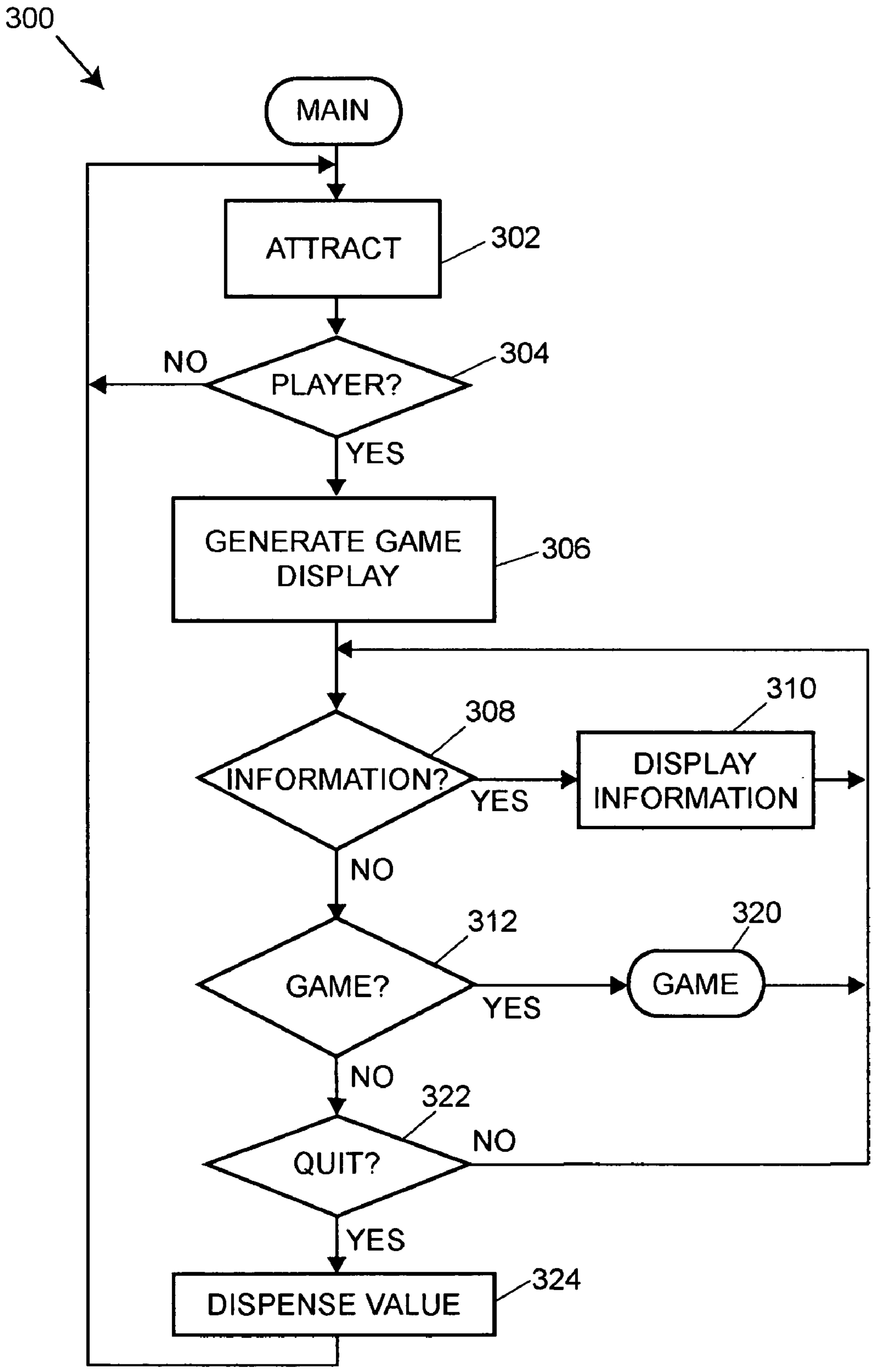
FIG. 11 is a flowchart of an alternative embodiment of a main routine that may be performed during operation of one or more of the gaming units.

FIG. 11 is a flowchart of an alternative main operating routine 300 that may be stored in the memory of the controller 100. The main routine 300 may be utilized for gaming units 20 that are designed to allow play of only a single game or single type of game. Referring to FIG. 11, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a “Cash Out” button, the controller 100 may dispense value to the player at block 324 based on the outcome of the game(s) played by the player. The operation may then return to block 302. If the player did not wish to quit as determined at block 322, the operation may return to block 308.

Video Poker

Figure 12:
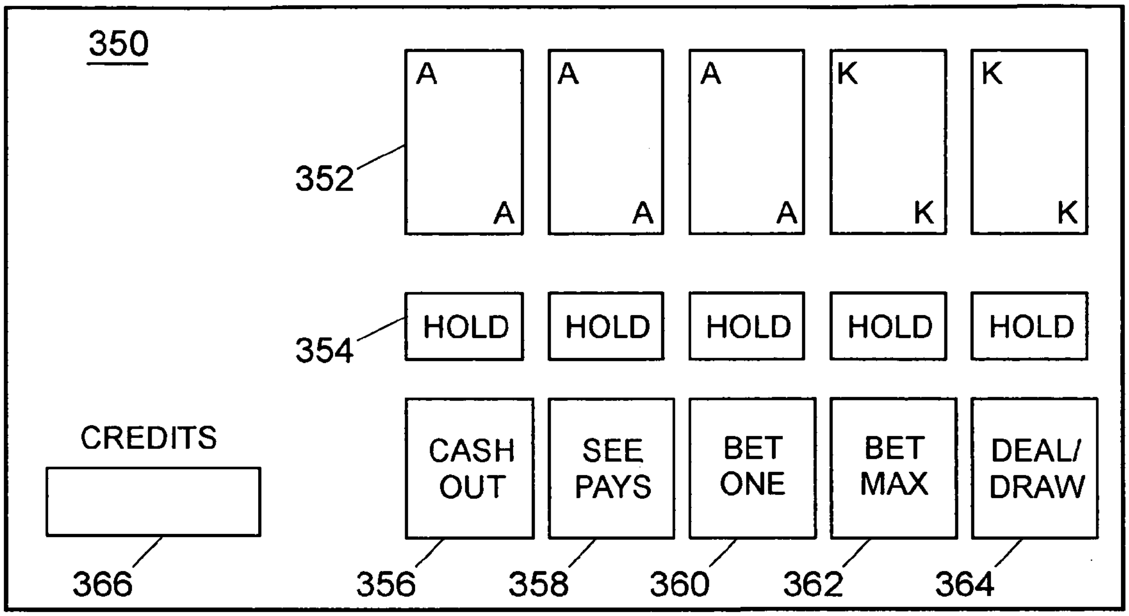
FIG. 12 is an illustration of an embodiment of a visual display that may be displayed during performance of the video poker routine of FIG. 14.

FIG. 12 is an exemplary display 350 that may be shown on the display unit 70 during performance of the video poker routine 210 shown schematically in FIG. 10. Referring to FIG. 12, the display 350 may include video images 352 of a plurality of playing cards representing the player’s hand, such as five cards. To allow the player to control the play of the video poker game, a plurality of player-selectable buttons may be displayed. The buttons may include a “Hold” button 354 disposed directly below each of the playing card images 352, a “Cash Out” button 356, a “See Pays” button 358, a “Bet One Credit” button 360, a “Bet Max Credits” button 362, and a “Deal/Draw” button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 14:
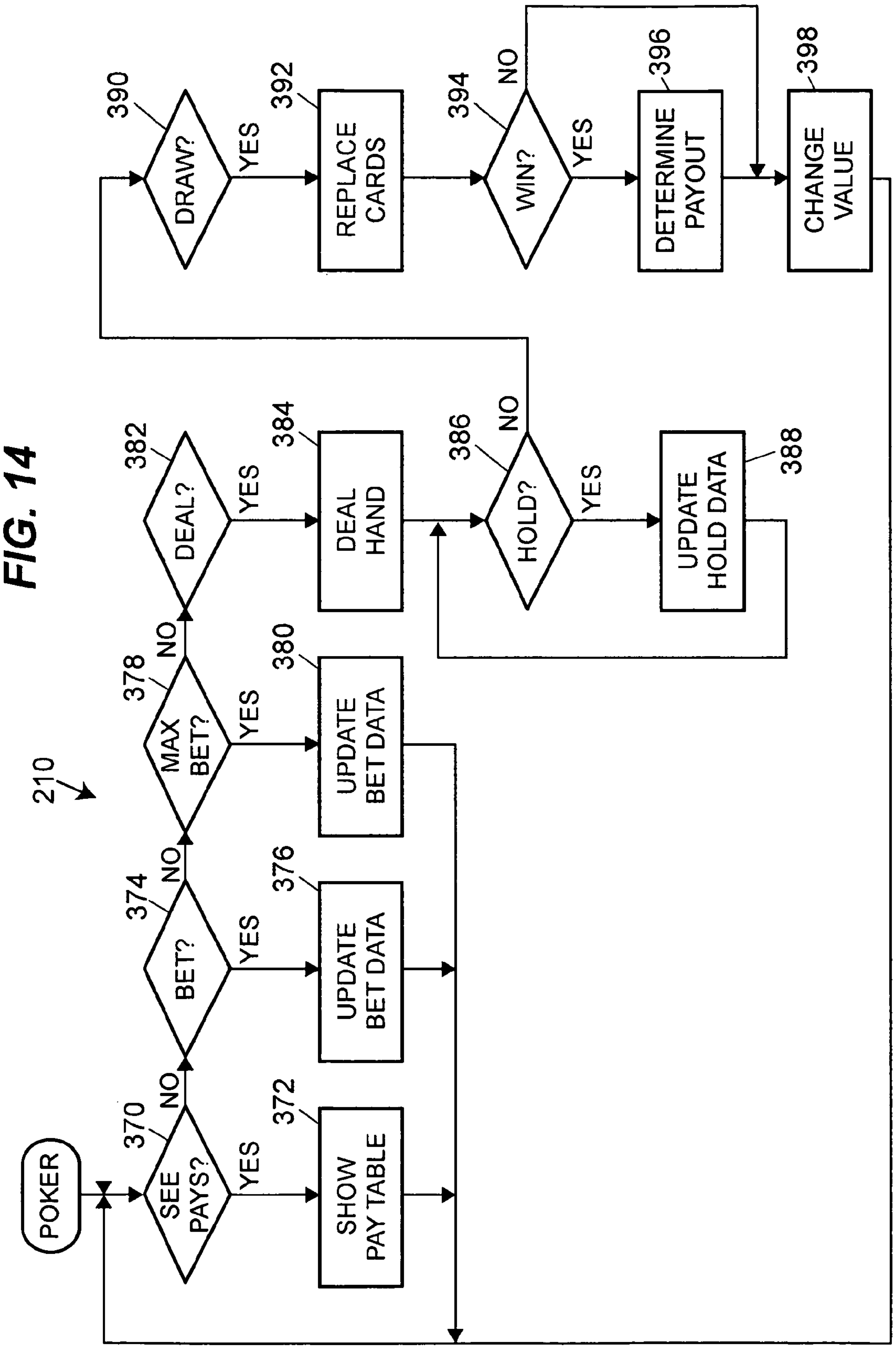
FIG. 14 is a flowchart of an embodiment of a video poker routine that may be performed by one or more of the gaming units.

FIG. 14 is a flowchart of the video poker routine 210 shown schematically in FIG. 10. Referring to FIG. 14, at block 370, the routine may determine whether the player has requested payout information, such as by activating the “See Pays” button 358, in which case at block 372 the routine may cause one or more pay tables to be displayed on the display unit 70. At block 374, the routine may determine whether the player has made a bet, such as by pressing the “Bet One Credit” button 360, in which case at block 376 bet data corresponding to the bet made by the player may be stored in the memory of the controller 100. At block 378, the routine may determine whether the player has pressed the “Bet Max Credits” button 362, in which case at block 380 bet data corresponding to the maximum allowable bet may be stored in the memory of the controller 100.

At block 382, the routine may determine if the player desires a new hand to be dealt, which may be determined by detecting if the “Deal/Draw” button 364 was activated after a wager was made. In that case, at block 384 a video poker hand may be “dealt” by causing the display unit 70 to generate the playing card images 352. After the hand is dealt, at block 386 the routine may determine if any of the “Hold” buttons 354 have been activated by the player, in which case data regarding which of the playing card images 352 are to be “held” may be stored in the controller 100 at block 388. If the “Deal/Draw” button 364 is activated again as determined at block 390, each of the playing card images 352 that was not “held” may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player’s cumulative value or number of credits may be updated by subtracting the bet made by the player and adding, if the hand was a winner, the payout value determined at block 396. The cumulative value or number of credits may also be displayed in the display area 366 (FIG. 12).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 13:
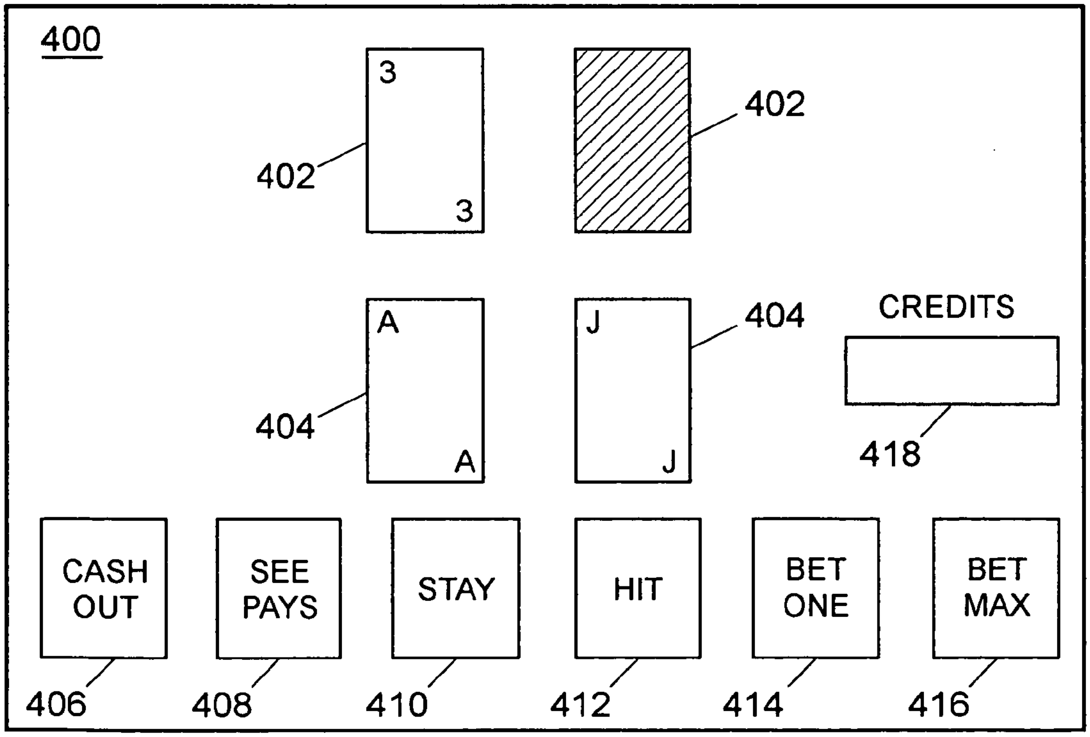
FIG. 13 is an illustration of an embodiment of a visual display that may be displayed during performance of the video blackjack routine of FIG. 15.

FIG. 13 is an exemplary display 400 that may be shown on the display unit 70 during performance of the video blackjack routine 220 shown schematically in FIG. 10. Referring to FIG. 13, the display 400 may include video images 402 of a pair of playing cards representing a dealer’s hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 15:
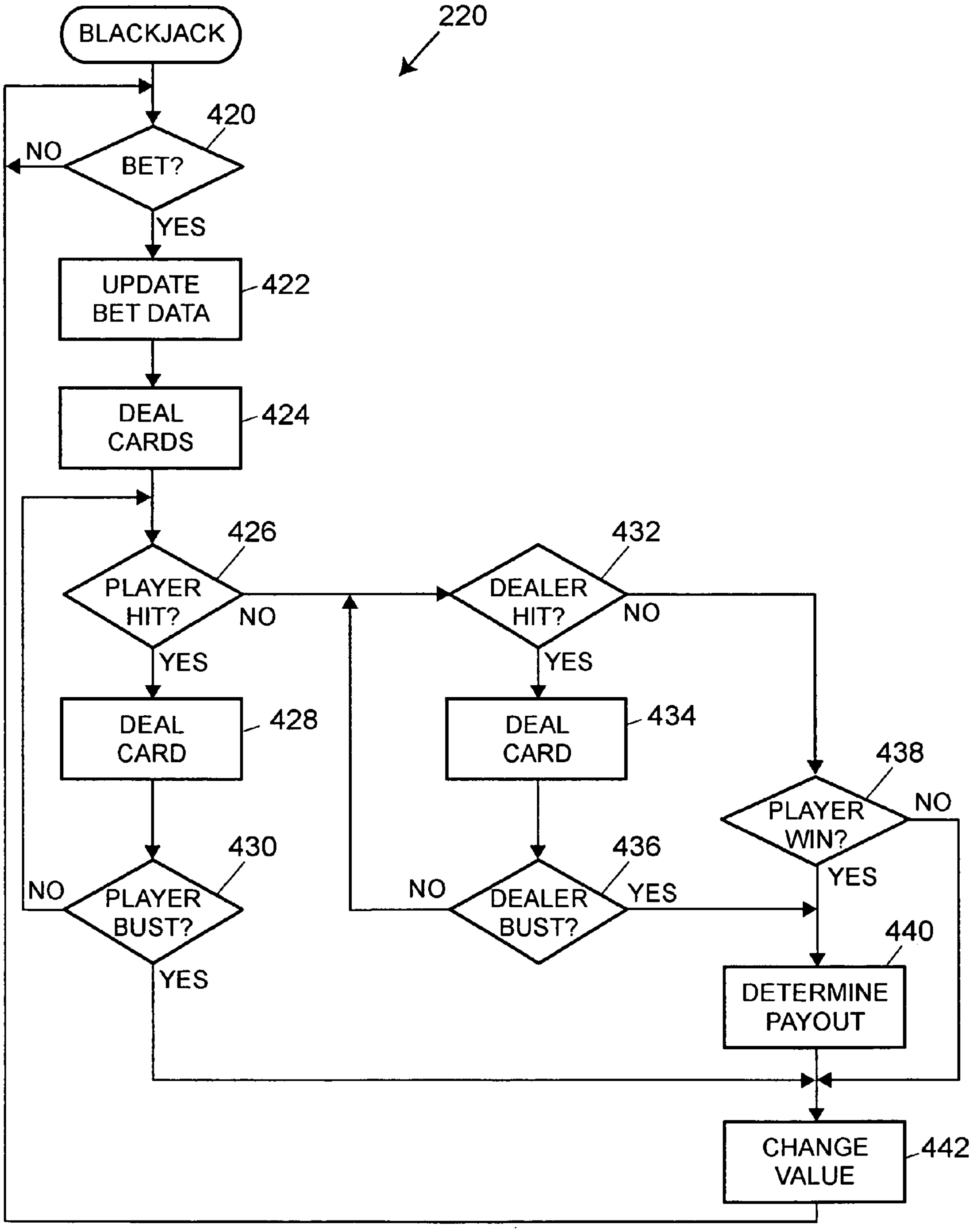
FIG. 15 is a flowchart of an embodiment of a video blackjack routine that may be performed by one or more of the gaming units.

FIG. 15 is a flowchart of the video blackjack routine 220 shown schematically in FIG. 10. Referring to FIG. 15, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 13).

Slots

Figure 16:
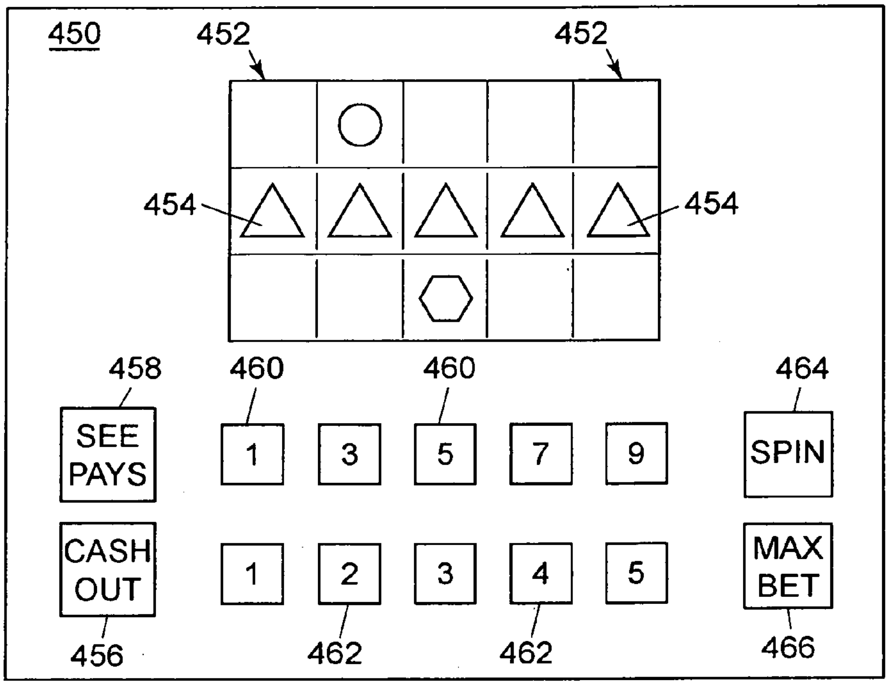
FIG. 16 is an illustration of an embodiment of a visual display that may be displayed during performance of the slots routine of FIG. 18.

FIG. 16 is an exemplary display 450 that may be shown on the display unit 70 during performance of the slots routine 230 shown schematically in FIG. 10. Referring to FIG. 16, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 18:
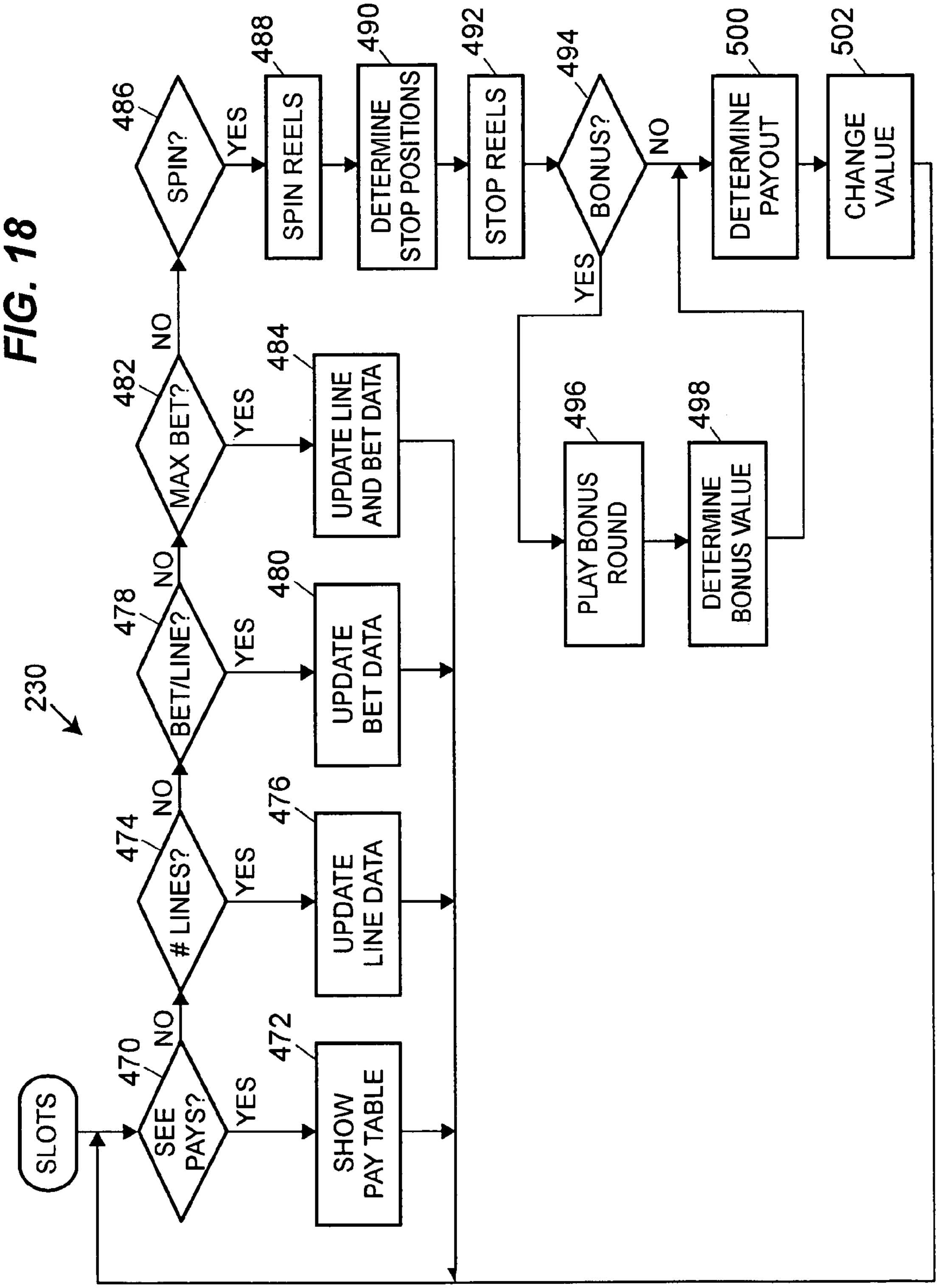
FIG. 18 is a flowchart of an embodiment of a slots routine that may be performed by one or more of the gaming units.
Figure 19:
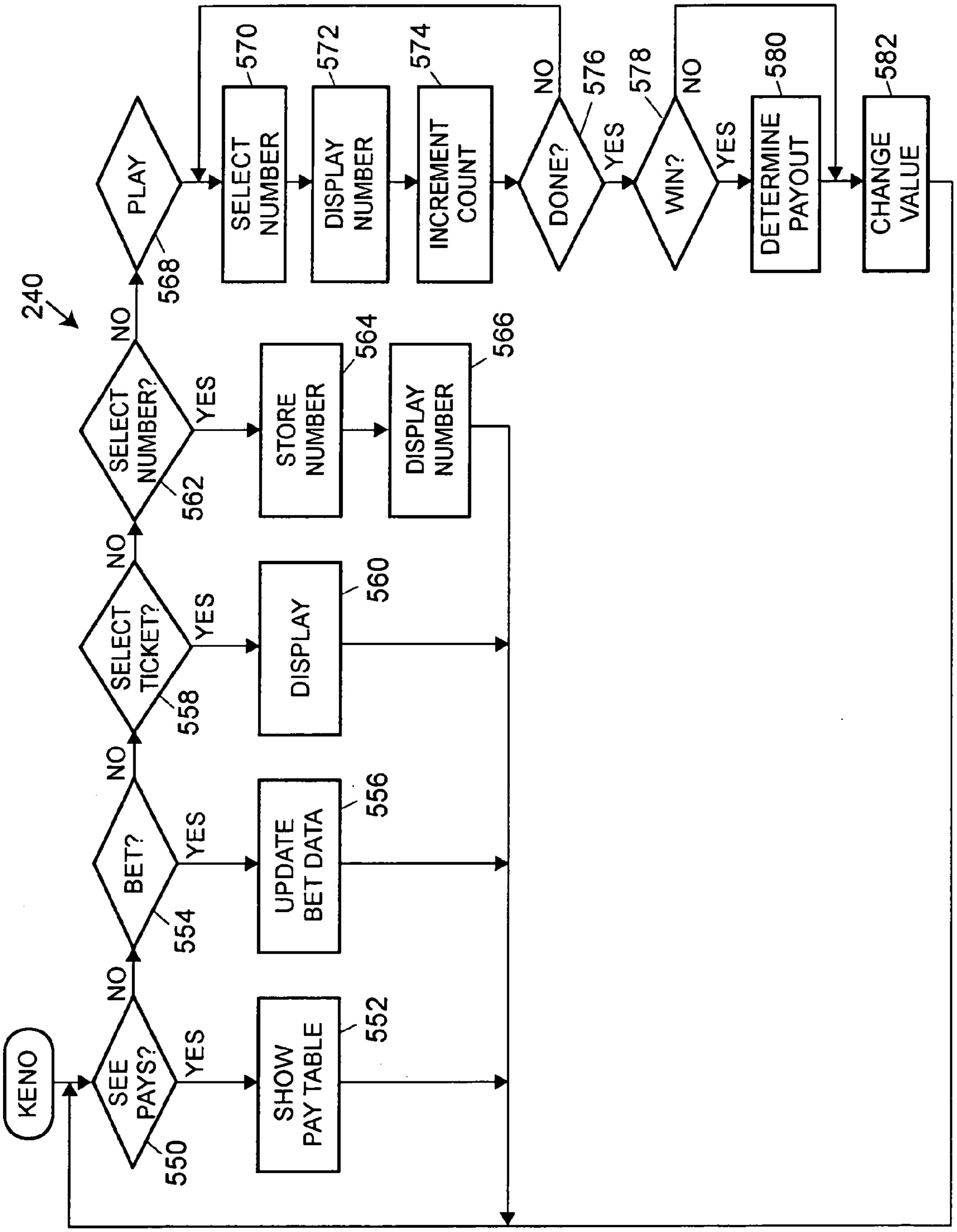
FIG. 19 is a flowchart of an embodiment of a video keno routine that may be performed by one or more of the gaming units.

FIG. 18 is a flowchart of the slots routine 230 shown schematically in FIG. 16. Referring to FIG. 18, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

Figure 17:
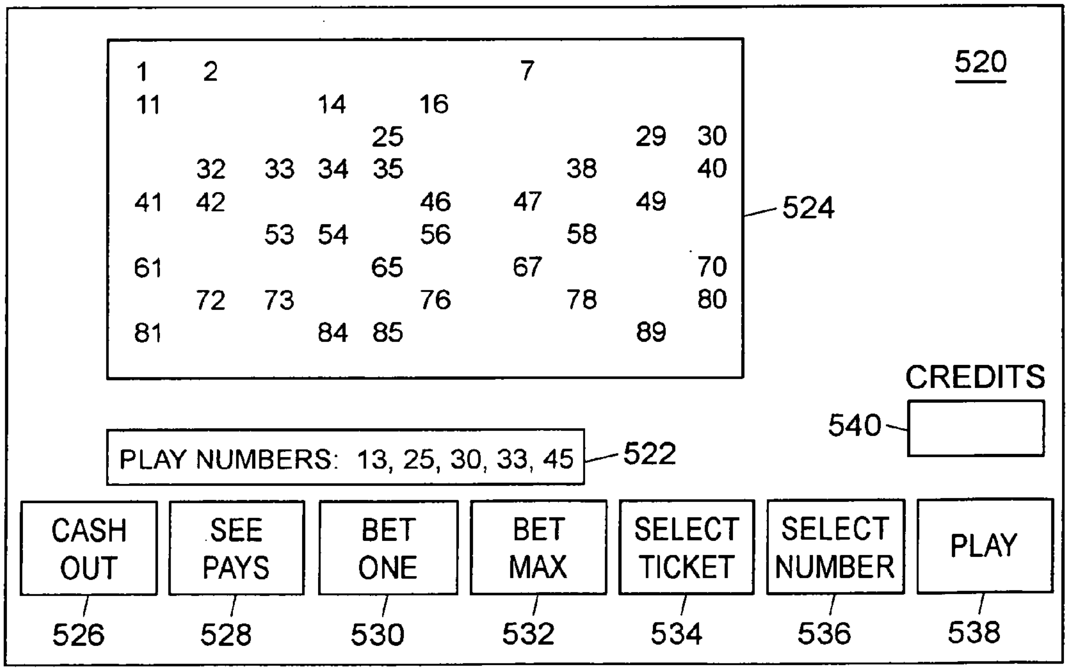
FIG. 17 is an illustration of an embodiment of a visual display that may be displayed during performance of the video keno routine of FIG. 19.

FIG. 17 is an exemplary display 520 that may be shown on the display unit 70 during performance of the video keno routine 240 shown schematically in FIG. 10. Referring to FIG. 17, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 20:
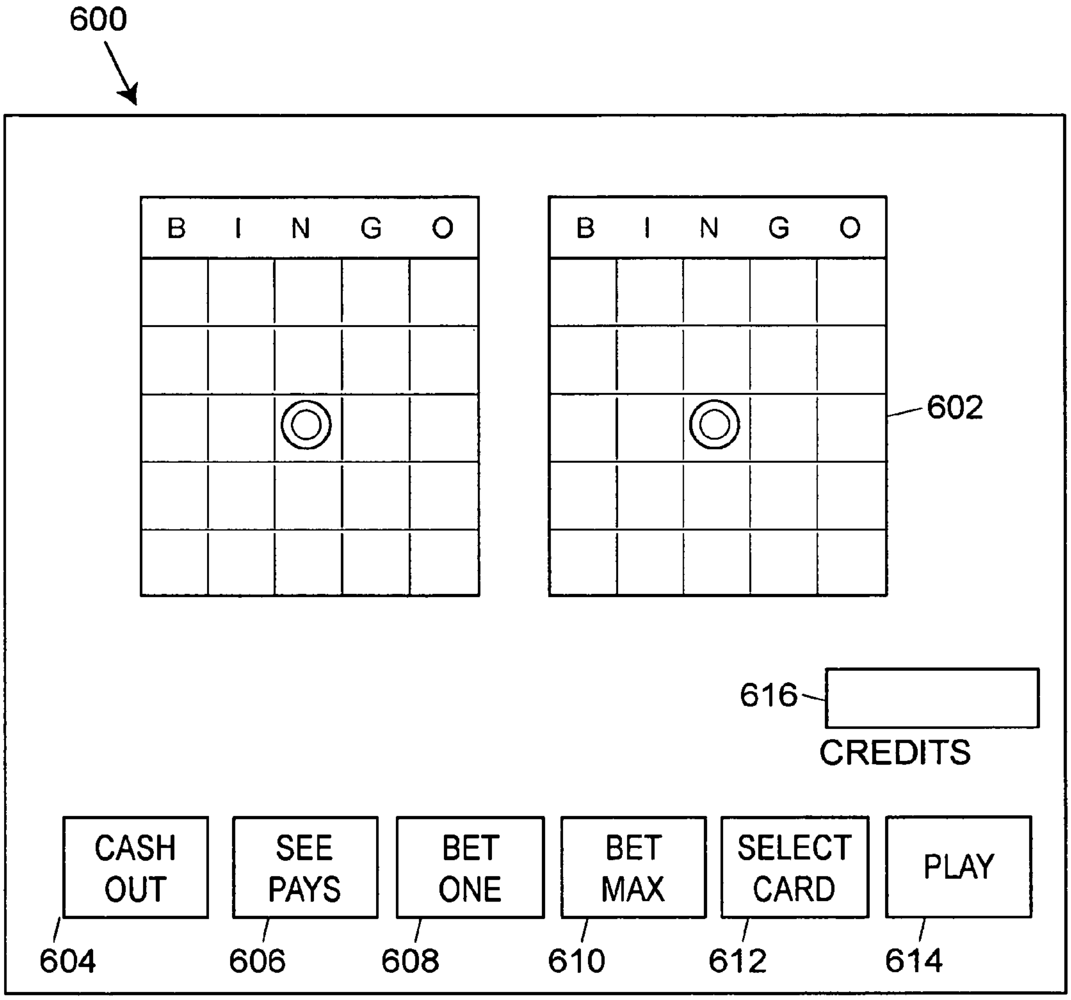
FIG. 20 is an illustration of an embodiment of a visual display that may be displayed during performance of the video bingo routine of FIG. 15.

FIG. 20 is a flowchart of the video keno routine 240 shown schematically in FIG. 10. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 20, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 17).

Video Bingo

FIG. 20 is an exemplary display 600 that may be shown on the display unit 70 during performance of the video bingo routine 250 shown schematically in FIG. 10. Referring to FIG. 20, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 21:
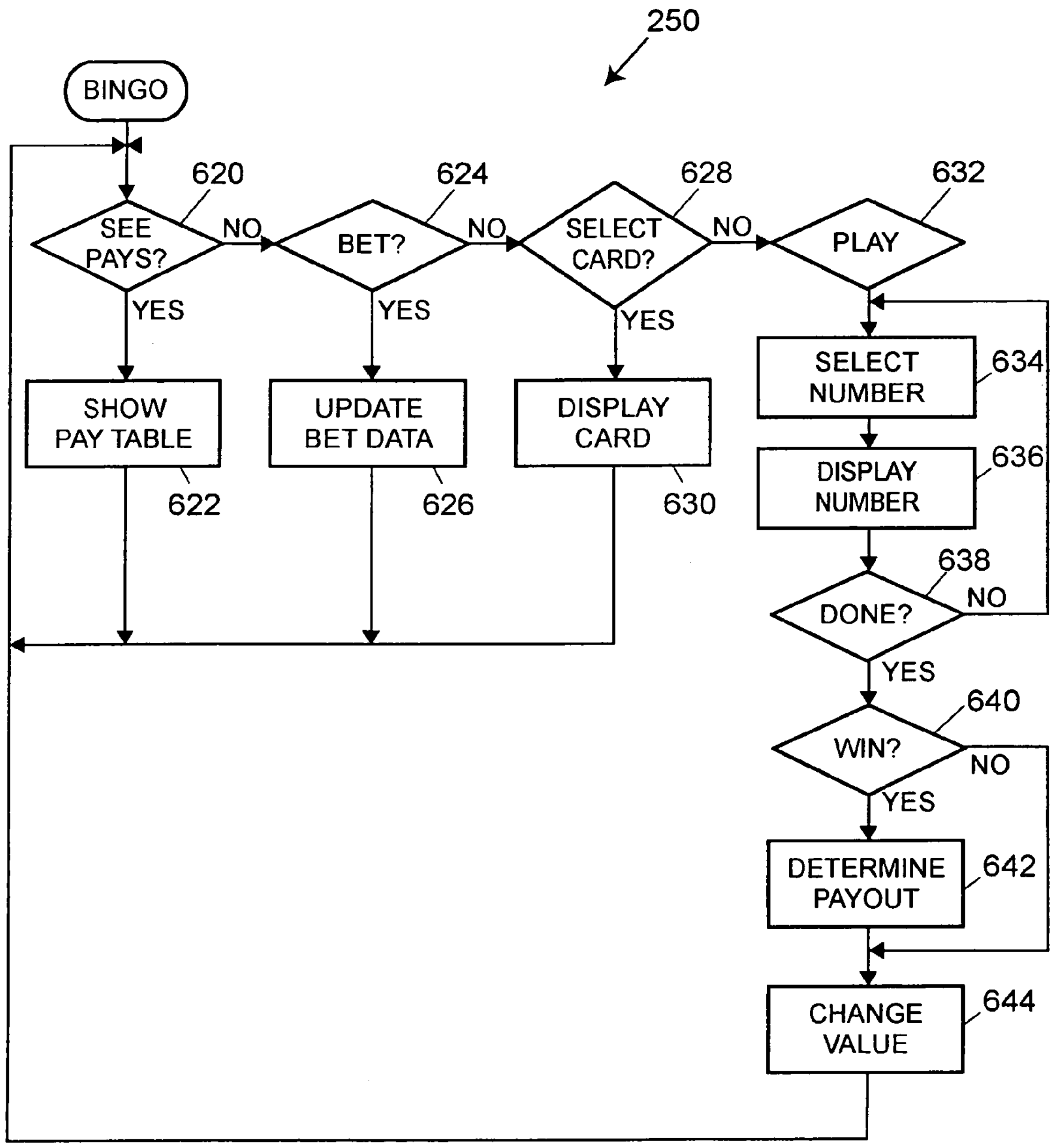
FIG. 21 is a flowchart of an embodiment of a video bingo routine that may be performed by one or more of the gaming units.

FIG. 21 is a flowchart of the video bingo routine 250 shown schematically in FIG. 10. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 21, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 20).

What is claimed is:

1. A gaming apparatus, comprising:

a display unit that is capable of generating video images;

a value input device;

a controller operatively coupled to said display unit and said value input device, said controller comprising a processor, a random access memory and a write-protected EPROM operatively coupled to said processor, wherein said write-protected EPROM has operating system software stored therein, includes a signature section uniquely marking said write-protected EPROM, is compressed, and includes random number generating software stored therein, said random number generating software being capable of causing a random number to be generated;

said controller being programmed to check the validity of a set of data stored on said write-protected EPROM using a data hashing algorithm, said controller being programmed to extract data stored on said write-protected EPROM and map said data into said random access memory, said controller being programmed to detect, in a computer software instruction, a name of a portion of a computer program to be executed, said controller being programmed to determine a memory address corresponding to said name of said portion of said computer program to be executed, said controller being programmed to cause said portion of said computer program to be retrieved from said memory utilizing said memory address, said controller being programmed to execute said portion of said computer program retrieved from said memory, said controller being programmed to authenticate a media storage device, said controller being programmed to allow a person to make a wager, said controller being programmed to cause a video image representing a game to be generated on said display unit, said video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, and said controller being programmed to determine a value payout associated with an outcome of said game.

2. A gaming apparatus as defined in claim 1 wherein said controller determines said memory address by accessing said memory to retrieve said memory address.

3. A gaming apparatus as defined in claim 1 wherein said controller determines said memory address by accessing said random access memory to retrieve said memory address.

4. A gaming apparatus as defined in claim 1 wherein said EPROM is an extended BIOS EPROM.

5. A gaming apparatus as defined in claim 1 wherein said EPROM has operating system software comprising only an operating system kernel stored therein.

6. A gaming apparatus as defined in claim 1 wherein said controller is further programmed to manipulate said portion of said computer program using said name.

7. A gaming apparatus, comprising:

a display unit that is capable of generating video images;

a value input device;

a controller operatively coupled to said display unit and said value input device, said controller comprising a processor, a random access memory and a write-protected EPROM operatively coupled to said processor, wherein said write-protected EPROM has an operating system kernel stored therein, is compressed, and includes random number generating software stored therein, said random number generating software being capable of causing a random number to be generated;

said controller being programmed to check the validity of a set of data stored on said write-protected EPROM using a data hashing algorithm, said controller being programmed to extract data stored on said write-protected EPROM and load said extracted data into said random access memory, said controller being programmed to detect, in a computer software instruction, a name of a computer program to be executed, said controller being programmed to access memory to retrieve a memory address corresponding to said name of said computer program to be executed, said controller being programmed to cause said computer program to be retrieved from said memory utilizing said memory address, said controller being programmed to execute said computer program retrieved from said memory, said controller being programmed to allow a person to make a wager, said controller being programmed to cause a video image to be generated on said display unit, said video image representing a game, and said controller being programmed to determine, after said video image has been displayed, a value payout associated with an outcome of said game represented by said video image.

8. A gaming apparatus as defined in claim 7 wherein said controller is programmed to access said extracted data in said random access memory to retrieve said memory address.

9. A gaming apparatus, comprising:

a display unit that is capable of generating video images;

a value input device;

a controller operatively coupled to said display unit and said value input device, said controller comprising a processor, a random access memory and a write-protected EPROM operatively coupled to said processor, wherein said write-protected EPROM has an operating system kernel stored therein, is compressed, and includes a signature section uniquely marking said write-protected EPROM, said write-protected EPROM memory having random number generating software stored therein, said random number generating software being capable of causing a random number to be generated, said controller being programmed to check the validity of a set of data stored on said write-protected EPROM using a data hashing algorithm, said controller being programmed to extract data stored on said write-protected EPROM and map said extracted data into said random access memory, said controller being programmed to detect, in a computer software instruction, a name of a file to be manipulated, said controller being programmed to determine a memory address corresponding to said name of said file to be manipulated, said controller being programmed to cause said file to be retrieved from said memory utilizing said memory address, said controller being programmed to manipulate said file retrieved from said memory, wherein said manipulating said file includes performing a function on said file, said function selected from the group of functions consisting of: copying said file, executing said file, and changing access permissions to said file, said controller being programmed to allow a person to make a wager, said controller being programmed to allow a person to make a payline selection, said controller being programmed to cause a video image to be generated on said display unit, said video image comprising a plurality of simulated slot machine reels of a slots game, each of said slot machine reels having a plurality of slot machine symbols, and said controller being programmed to determine a value payout associated with an outcome of said slots game, said controller being programmed to determine said outcome of said slots game based on a configuration of said slot machine symbols.

10. A gaming apparatus as defined in claim 9, wherein said EPROM comprises a signature section, said signature section comprising said data hashing algorithm.

11. A gaming apparatus, comprising:

a display unit that is capable of generating video images;

a value input device;

a controller operatively coupled to said display unit and said value input device, said controller comprising a processor, a random access memory and a write-protected EPROM operatively coupled to said processor, wherein said write-protected EPROM has an operating system kernel stored therein, is compressed, and includes random number generating software stored therein, said random number generating software being capable of causing a random number to be generated;

said controller being programmed to extract data stored on said write-protected EPROM and map said extracted data into said random access memory, said controller being programmed to detect, in a computer software instruction, a filename of a file to be retrieved, wherein said filename comprises a plurality of alphanumeric characters, said controller being programmed to determine a memory address corresponding to said filename of said file to be retrieved, wherein said controller determines said memory address by accessing said random access memory to retrieve said memory address, said controller being programmed to cause said file to be retrieved from said EPROM utilizing said memory address, wherein said file is selected from the group of files consisting of: text files, executable files, and HTML files, said controller being programmed to allow a person to make a wager, said controller being programmed to cause a video image representing a game to be generated on said display unit, said video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, and said controller being programmed to determine a value payout associated with an outcome of said game.

12. A gaming apparatus, comprising:

a value input device;

a mechanically rotatable wheel;

a controller operatively coupled to said mechanically rotatable wheel and said value input device, said controller comprising a processor, a random access memory, a main BIOS EPROM and a write-protected, extended BIOS EPROM operatively coupled to said processor, wherein said write-protected, extended BIOS EPROM has an operating system kernel stored therein, is compressed, and includes a signature section uniquely marking said write-protected, extended BIOS EPROM, and wherein said main BIOS EPROM includes a hash value of said write-protected, extended BIOS EPROM and a hashing algorithm to verify said data on said write-protected, extended BIOS EPROM;

said controller being programmed to extract data stored on said write-protected, extended BIOS EPROM and map said extracted data into said random access memory, said controller being programmed to detect, in a computer software instruction, a name of a portion of a computer program to be executed, said controller being programmed to access memory to retrieve a memory address corresponding to said name of said portion of said computer program to be executed, said controller being programmed to cause said portion of said computer program to be retrieved from said write-protected, extended BIOS EPROM utilizing said memory address, said controller being programmed to execute said portion of said computer program retrieved from said write-protected, extended BIOS EPROM, said controller being programmed to allow a person to make a wager, and said controller being programmed to determine a value payout associated with an outcome of a game incorporating said mechanically rotatable wheel.

13. A gaming apparatus as defined in claim 12 wherein said write-protected, extended BIOS EPROM comprises a data hashing algorithm to verify the content of the data stored on said write-protected, extended BIOS EPROM.

14. A gaming method comprising:

storing an operating system kernel in a write-protected, extended BIOS EPROM, compressing and storing a random number generating software on said write-protected, extended BIOS EPROM, said random number generating software capable of causing a random number to be generated, programming a main BIOS EPROM to look for said write-protected, extended BIOS EPROM during a system boot-up, programming said main BIOS EPROM to determine if the write-protected, extended BIOS EPROM is verified, programming said main BIOS EPROM to check the integrity of at least a portion of said write-protected, extended BIOS EPROM, extracting at least a portion of compressed data from said write-protected, extended BIOS EPROM and mapping said extracted data into a random access memory, detecting, in a computer software instruction, a name of a portion of a computer program to be executed, determining a memory address corresponding to said name of said portion of said computer program to be executed, causing said portion of said computer program to be retrieved from said random access memory utilizing said memory address, executing said portion of said computer program retrieved from said random access memory, causing a video image representing a game to be generated, said video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, and said video image comprising an image of a bingo grid if said game comprises video bingo; and determining a value payout associated with an outcome of said game represented by said video image.

15. A gaming method as defined in claim 14, comprising determining said memory address by accessing said data mapped into said random access memory to retrieve said memory address.

16. A gaming method as defined in claim 14, comprising storing a hash value and a data hashing algorithm on said main BIOS EPROM, said hash value corresponding to a hash value for said write-protected, extended BIOS EPROM.

* * * * *